May 1, 1928.
J. C. CRIMMINS
1,667,967
ADJUSTABLE ROUTE INDICATOR FOR AUTOVEHICLES
Filed Oct. 11, 1926
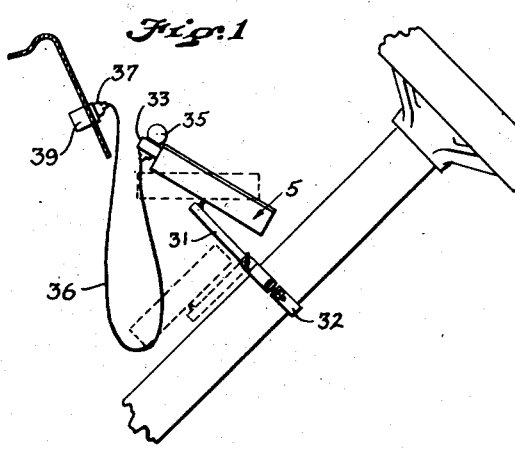
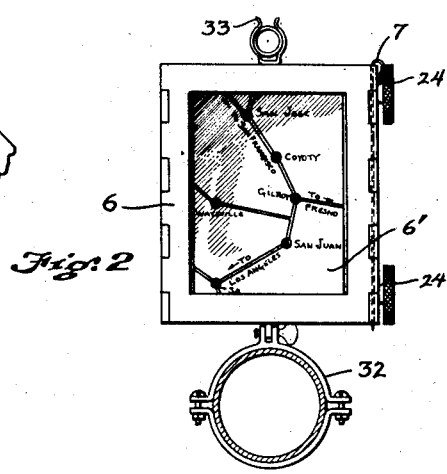
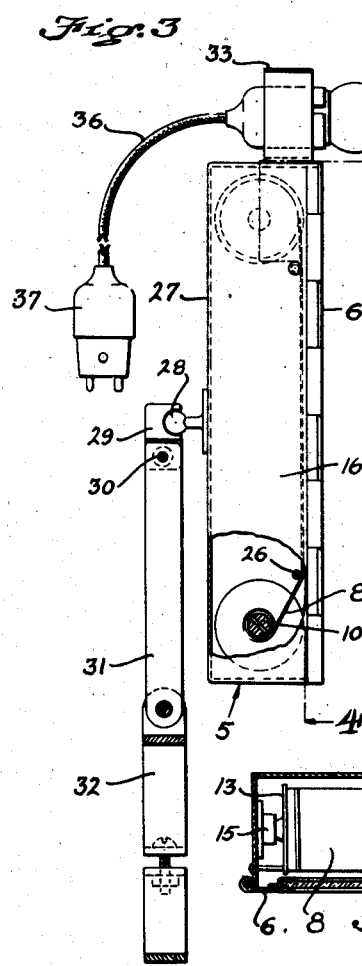
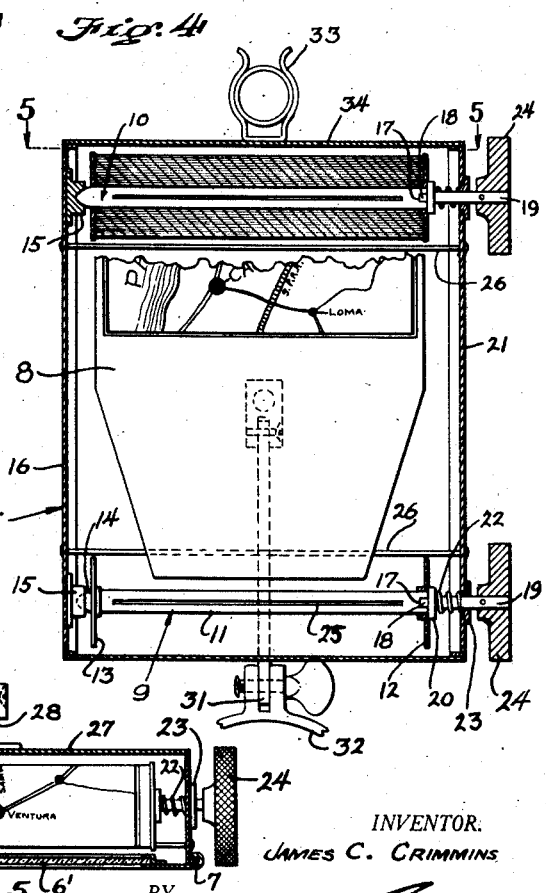
INVENTOR.
JAMES C. CRIMMINS
BY
ATTORNEY.

Patented May 1, 1928.

1,667,967

UNITED STATES PATENT OFFICE.

JAMES C. CRIMMINS, OF SHERMAN, CALIFORNIA.

ADJUSTABLE ROUTE INDICATOR FOR AUTOVEHICLES.

Application filed October 11, 1926. Serial No. 140,722.

This invention relates to a manually operated mechanism for displaying to a vehicle operator a road map of the route over which the vehicle is passing.

A main object of the invention is to provide a simple reeling mechanism for road maps that may be detachably connected to a portion of a motor vehicle within convenient sight of the driver to enable the driver to determine at all times the position of the vehicle along the route which it is traversing.

Another object is to provide a device which may be quickly adjusted after the same is secured to a vehicle to bring the map ribbon in convenient sight of the driver.

A further object is to provide a mechanism in which different road maps may be quickly mounted within the device or removed therefrom.

A still further object is the provision of a manually operated reeling mechanism by which it is possible to instantly readjust the route map to provide for detours, or a temporary change of route.

The above and other objects are accomplished by means of the device described in the accompanying specification in connection with the accompanying drawings, in which:

Fig. 1 is a side elevation of a portion of the steering column of an auto vehicle showing the device detachably secured thereto, and in dotted lines some of its adjusted positions.

Fig. 2 is a front face view of the road indicator.

Fig. 3 is an enlarged side elevation of the indicator partly broken away and partly in section.

Fig. 4 is a sectional front view of the indicator taken on line 4—4 of Fig. 3.

Fig. 5 is a transverse section taken on line 5—5 of Fig. 4.

Referring now more particularly to the drawings 5 indicates a rectangular sheet metal casing for the indicating mechanism which is mounted therein, provided with a hinged closure 6. This closure is secured in practically dust proof relation to the casing by means of a pin 7, or other suitable securing means, and is provided with a sight opening having a transparent member 6' such as glass or celluloid mounted therein to enable a display of a section of the ribbon strip map 8 to the vehicle driver.

The mechanism for operating the road map 8 mounted within the casing 5 preferably consists of a pair of reels 9 and 10, disposed at the respective ends of the casing, and as each reel is exactly alike and operates in the same manner, for brevity of description only one will be described. Reel 9 consists of a spindle 11 provided at each of its ends with a circular flange 12 and 13, the inner end 14 of the spindle engaging a thrust bearing 15 secured to the inner face of the side wall 16 of the casing. The outer end of the spindle is provided with a key slot 17 that is engaged by a key 18 formed on the inner end of the operating shaft 19. Shaft 19 has a circular flange 20, adjacent the key, and mounted on the shaft between flange 20 and the side wall 21 of the casing is a coiled spring 22 that serves to force the key 18 of the operating shaft into positive engagement with the key slot of the spindle. The operating shaft 19 passes through a bearing 23 formed in the wall 21 of the casing and has secured to its outer end a knurled operating knob 24 for the purpose of rotating the spindle to wind the map thereon.

The side walls of the indicating strip map taper towards each of their ends in order that they may be readily inserted in slots 25 of the spindles to enable the same to be wound therearound.

Each strip map 8 has depicted on its outer face a portion of a complete map such as the valley road from Los Angeles to San Franciso, California, a distance of approximately 485 miles. In the map illustrated only a portion of the entire distance will be visible. and as soon as the vehicle has traversed the distance shown on exposed part the knob 24 is rotated to expose an additional portion. When the entire strip map has been exposed and is wound upon the upper reel, the same is removed and the lower reel 9 is substituted therefor, at the same time a full reel containing a continuation of the route is mounted in the lower portion of the case.

In order that the exposed portion of the strip map may be disposed close to the under face of the transparent member 7, guide bars 26, are transversely secured between the side walls 16, 21, of the casing, the strip map passing thereover.

The route indicating device is designed to be mounted on the steering column of the motor-vehicle as shown in Fig. 1 in order that the same will at all times be in plain view of the vehicle driver. The outer face of the bottom wall 27 of the casing at approximately the center thereof is provided with a ball bearing 28 that engages a socket member 29 secured at 30 to the upper end of a link bar 31, the lower end of said bar being in turn pivoted to a circular clamp 32 that engages the steering column. By means of the link bar 31 the device may be conveniently folded against the steering column when not in use, as shown in dotted lines in Fig. 1, and the casing may be tilted at any angle desired to suit the convenience of the driver, the ball and socket permitting of such adjustment.

In order to render the exposed face of the strip map visible during night driving a pair of spring clamping arms 33 are provided, said arms being secured to the upper end wall 34 of the casing, for the reception of a light bulb 35 being mounted between the same, the flexible light cord 36 therefrom carrying a plug 37 engages a light socket 39 on the vehicle instrument board.

From the above description it will be apparent that I have provided a simple device that may be conveniently manipulated by a vehicle driver for displaying a map of the route over which the vehicle is travelling. As the device is not synchronism with the movement of the vehicle, any deviation from the route occasioned by detours may be quickly provided for by a simple manual operation of the map reels.

What I claim is:

In a route indicator for vehicles, a box casing, thrust bearings on the interior of said casing, map carrying means in said casing comprising a plurality of reels, each of said reels consisting of a spindle, circular end plates on each of said spindles, one end of each spindle engaging a thrust bearing, the opposite end of said spindle having a key slot therein, an operating shaft engaging in said key slot and extending through said casing, a flange on said shaft, and resilient means between said casing and said flange for maintaining the shaft in the slot and the flange against an end plate.

In witness that I claim the foregoing I have hereunto subscribed my name this 22nd, day of September, 1926.

JAMES C. CRIMMINS.